United States Patent

[11] 3,634,843

[72] Inventor Charles J. Corris
    Bridgeport, Conn.
[21] Appl. No. 767,357
[22] Filed Oct. 14, 1968
[45] Patented Jan. 11, 1972
[73] Assignee Product Development Services, Inc.
    Fairfield, Conn.

[54] CIRCUIT AND METHOD FOR DETECTING LOCALIZED NOISE LEVEL CHANGES AND ESPECIALLY ELECTROMAGNETIC NOISE
10 Claims, 2 Drawing Figs.

[52] U.S. Cl. .................................... 340/258 D,
                                  340/38 L, 340/258 C
[51] Int. Cl. ................................................ H04b 7/00
[50] Field of Search .......................................... 340/258 C,
                                 261, 258, 258 D, 38 L, 248 P

[56] References Cited
UNITED STATES PATENTS

| | | | |
|---|---|---|---|
| 2,347,194 | 4/1944 | Holliday | 340/38 UX |
| 3,314,066 | 4/1967 | Schwartz et al. | 340/258 UX |
| 2,991,458 | 7/1961 | Cook et al. | 340/258 X |
| 3,068,448 | 12/1962 | Mountjoy et al. | 340/38 |
| 3,147,467 | 9/1964 | Laakmann | 340/261 |
| 3,258,762 | 6/1966 | Donner | 340/258 X |
| 3,340,521 | 9/1967 | Patterson, Jr. et al. | 340/261 X |
| 3,465,339 | 9/1969 | Marner | 340/248 UX |
| 3,508,238 | 4/1970 | Baker | 340/258 |

Primary Examiner—John W. Caldwell
Assistant Examiner—Michael Slobasky
Attorney—Wooster, Davis and Cifelli ABSTRACT: A detection circuit responsive to a localized increase in magnetic noise level such as would be produced by an automobile ignition system. Sensing coils are positioned to detect the presence of such noise and provide an electrical output. The electrical output of the sensing coils is amplified and passed to networks having differing time constants. Both networks feed into a comparator which, in turn, actuates an alarm. The comparator actuates the alarm only when it receives signals of different intensities. Thus the two networks function to provide a threshold for the signaling device which is automatically reset as required.

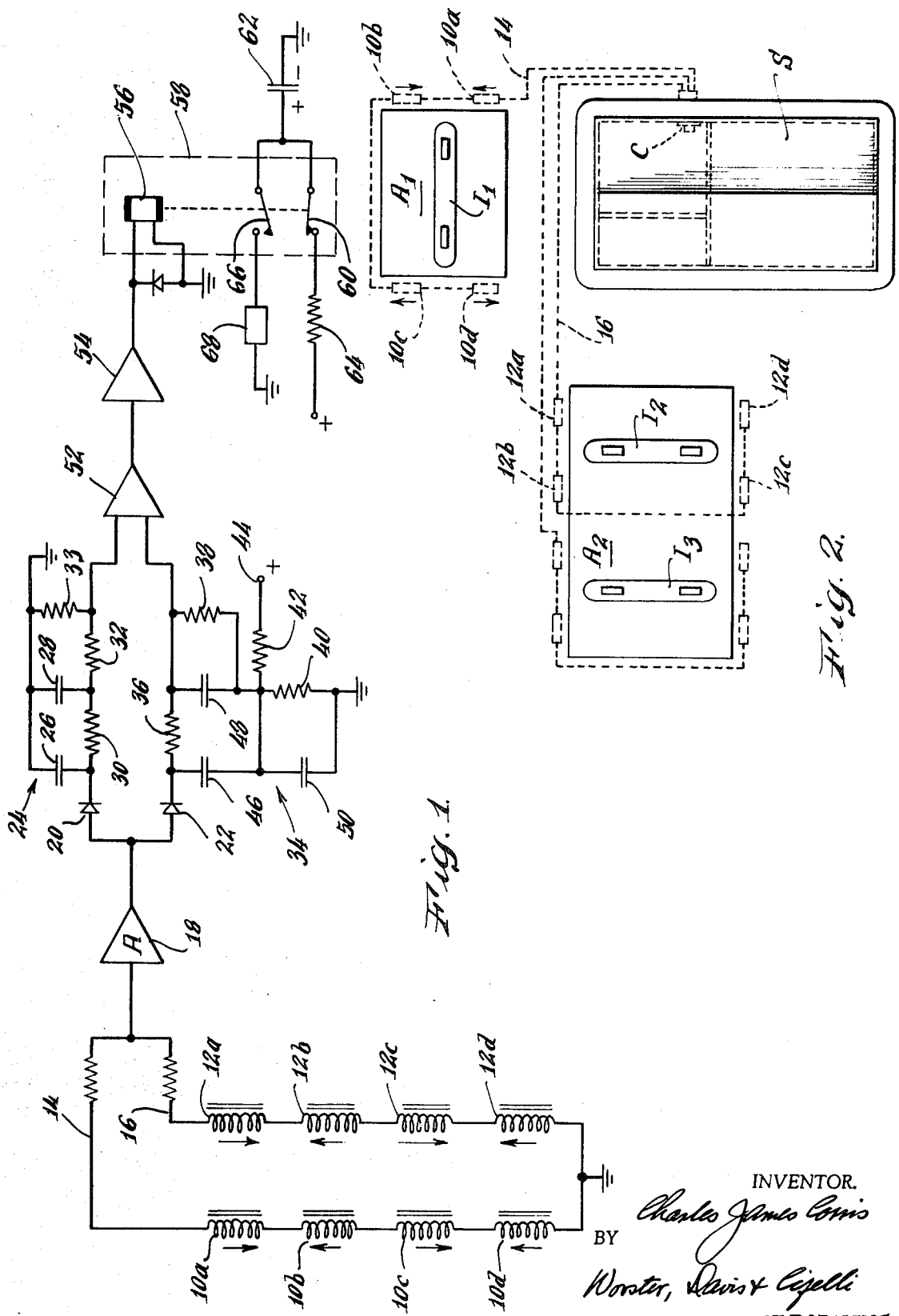

CIRCUIT AND METHOD FOR DETECTING LOCALIZED NOISE LEVEL CHANGES AND ESPECIALLY ELECTROMAGNETIC NOISE

BACKGROUND OF THE INVENTION

There are many environments in which it is desirable to detect the presence of automotive vehicles. Possibly the best known is the common gasoline service station. In such stations, and in other applications as well, it is common to install a sensing system which includes hoses laid across the surface of the pavement in the path of oncoming vehicles. Compression of a hose by the weight of an automobile operates a signal within the station. These prior art devices have a number of serious deficiencies. For example, as they lie exposed on the surface of the pavement, they are subject to injury as by snowplows or snow shovels. Since these hoses are exposed year round to weather, their lives are relatively short and operation may be impeded by accumulations of ice and packed snow. Furthermore, small boys delight in jumping upon and riding bicycles over these hoses to actuate the alarms.

Accordingly, it is a primary object of the present invention to provide an improved sensing circuit and method particularly useful in sensing motor vehicles.

Other objects are to provide such a circuit in which the sensing elements are not exposed; and to provide such a circuit which cannot be inadvertently or purposely actuated except by motor vehicles.

SUMMARY OF THE INVENTION

The objects of this invention are achieved by a detection circuit which is responsive to a change in noise level in one locality of a surveillance region. The circuit includes a plurality of sensing element means which are located within the region, each being adapted to produce an electrical output in response to detected noise. Two electrical networks, one having a short time constant and the other a long time constant, are connected to receive the outputs of the sensing elements. A comparator receives the outputs of the two networks and produces a signal when the outputs are unequal. An alarm is actuated by this signal.

BRIEF DESCRIPTION OF THE DRAWING

The manner in which the objects of this invention are achieved will be more apparent from the following description, the appended claims and the FIGS. of the attached drawing, wherein:

FIG. 1 is a schematic diagram of a detection circuit in accordance with this invention; and FIG. 2 is one example of the manner in which such a circuit may be installed in a service station application.

DESCRIPTION OF THE PREFERRED EMBODIMENT

The circuit of this invention operates by the detection of electromagnetic radiation, such as would be produced by the ignition circuit of an automobile engine. This radiation is detected by means of wound sensing coils buried beneath the pavement of a service station, or other facility, in the path of oncoming vehicles. Although any required number of sensors may be employed, the circuit of FIG. 1 includes four coils 10a–d, comprising one set, and four coils 12a–d, comprising another set. These coils are wound and connected in such a manner that their output polarities are reversed, as indicated by the arrow symbols. This has the advantage of suppressing background radiation, such as might be produced, for example, by fluorescent lighting installed over the surveillance region.

The outputs of the sensing units are supplied by suitable cables 14, 16 to the input of a broadband amplifier 18 responsive to input frequencies in the 300 Hz.–6 Hz. range and having an amplification factor in the disclosed embodiment of approximately 15,000. The AC output of the amplifier 18 is rectified by two diodes 20, 22. The rectified output of diode 20 is supplied to a network 24 having a relatively short time constant. This network comprises 1-microfarad capacitors 26, 28, a 1,000-ohm resistor 30, a 10,000-ohm resistor 32, and a 100,000-ohm resistor 33. With circuit elements of these values, the time constant of network 24 is approximately 1 millisecond. The rectified output of diode 22 is applied to a network 34 having a relatively long time constant. This network includes a 10,000-ohm resistor 36, a 100,000-ohm resistor 38, and a 100-ohm resistor 40. In addition, a 1,000-ohm resistor 42 supplies the network with a bias voltage of approximately 1 volt DC from a positive terminal 44. Also included in the network 34 are capacitors 46, 48, 50 having capacitances of 1, 2, and 25 microfarads, respectively. With circuit components of these values, the time constant of network 34 is approximately 50 milliseconds. The output from networks 24, 34 is supplied to a comparator 52 of standard design. When the output from network 24 exceeds that from network 34, the comparator produces a signal which is amplified by a relay driver 54 and operates the coil 56 of a relay 58. Relay 58 includes normally closed contacts 60 connected in series with a 2,000-microfarad capacitor 62 and a 220-ohm resistance 64 across a DC power supply. A normally open contact 66 is connected in series with the capacitor 62 and a chime 68, both ends of this circuit being grounded.

FIG. 2 illustrates the manner in which circuits similar to FIG. 1 may be installed in an actual service station environment. In this arrangement, the service station S includes two concrete aprons $A_1$, $A_2$ provided with three pumps islands $I_1$, $I_2$, and $I_3$. A suitable cabinet C within the station houses the power supply, electronic components, and chime. The sensing coils are buried beneath the pavement adjacent the concrete aprons and in the path of oncoming automobiles. In the embodiment of FIG. 2, a third set of sensing coils is also provided for island $I_3$ and, as previously described, may number of such sensing coils may be employed.

An important feature of this invention is the provision of the two networks 24, 34 having different time constants. The network 34 with the longer time constant sets a threshold level for the comparator 52. The short time constant network 24 is the input to the other side of the comparator. A simple example will suffice to explain the operation of this circuit. Assume, first, that no automobiles are present. Some background radiation may exist in spite of the reversed polarities of the sensing coils. However, the outputs from the networks 24, 34 to the comparator 52 will be equal so that no signal is produced by the comparator. Assume, now, that an automobile is driven across sensing coil 10a. The electrical circuits operating within the automotive engine produce electromagnetic fields which, in turn, induces an electrical output in sensing coil 10a. This output is amplified by amplifier 18 and rectified by diodes 20, 22. The rectified signal from diode 20 passes through network 24 and into comparator 52 in approximately 1 millisecond. However, the corresponding output from diode 22 is delayed for approximately 50 milliseconds. As a result, comparator 52 perceives an unbalance and produces an output signal which is amplified by relay driver 54 and actuates coil 56. Prior to the actuation of relay 58, capacitor 62 has been maintained in a charged condition through normally closed contact 60. However, this contact now opens and contact 66 closes, permitting capacitor 62 to discharge through chime 68 to indicate the vehicle's approach to the station attendant. If the automobile continues across and beyond sending coil 10a, the system returns to its original condition.

Assume, now, that the automobile stops in the vicinity of sensing coil 10a with its motor running. In 50 milliseconds, the signal produced by diode 22 will have traversed the network 34 so that the comparator 52 will once more perceive equal signals and will no longer produce an output. However, a new threshold is now established—namely, that produced by the presence of the automobile. Accordingly, if a second vehicle now approaches a different sensing coil, the comparator 52 will perceive an unbalance above and beyond this new threshold and the circuit will function in an exactly similar manner to provide the station attendant with another signal. It will also be apparent that, should the parked automobile be moved, the threshold will revert back to its original value.

In the event there is no background noise in a particular installation, the small differential voltage provided to network 34 from positive terminal 44 provides a factor of stability to the circuit.

It will now be apparent that the circuit of this invention accomplishes all the objectives hereinbefore set forth and that this novel circuitry is applicable to many different applications. For example, it may be used for vehicle sensing in parking garages, drive-up bank windows, private driveways, and for highway traffic counting. It will also be apparent that the principles of this invention are not necessarily restricted to electromagnetic radiation within the frequency ranges produced by automotive systems. For example, the principles of the invention may be utilized to respond equally well to changes in acoustical noise, heat, and higher-frequency electromagnetic radiation, such as light. Accordingly, the term "noise" as used in the following claims, it is to construed as having its scientific meaning of a combination of a nonharmonious group of frequencies.

What is claimed is:

1. A detection circuit responsive to a change in noise level in one portion of a surveillance region which comprises: a plurality of sensing element means within said region, each of said sensing element means being adapted to produce an electrical output in response to detected noise; a first network having a relatively short time constant connected to receive the electrical output of said sensing element means and producing a first output signal responsive thereto, said first network being quickly responsive to changes in said detected noise by virtue of said short time constant rendering said first output signal representative of sudden changes in said detected noise; a second network having a relatively long time constant connected to receive the electrical output of said sensing element means and producing a second output signal responsive thereto, said second network being slowly responsive to changes in said detected noise by virtue of said long time constant rendering said second output signal representative of a continuously readjusted ambient level of detected noise; comparator means connected to receive said first and second output signals of said first and second networks for producing a signal only when said first output signal is greater than said second output signal; and alarm means actuated by said signal for providing an alarm indication only when said first output signal is greater than said second output signal.

2. The circuit of claim 1 wherein said sensing element means comprise series connected coils.

3. The circuit of claim 1 wherein said sensing element means comprise coils, the output polarities of approximately half of said coils being opposed to the output polarities of the remaining coils.

4. The circuit of claim 1 wherein said alarm means comprises a relay having a coil connected to receive the output of said comparator means; and an alarm circuit including an alarm device, a capacitor, a power source and the contacts of said relay; one of said contacts being normally closed and connecting said power source to said capacitor and another of said contacts being normally open and connecting said capacitor to said alarm device when said relay is energized.

5. The circuit of claim 1 wherein said sensing element means comprise series connected coils, one half being of reversed polarity relative to the other half, said coils being positioned below ground level to detect electromagnetic noise from the electrical systems of automotive vehicles.

6. The method of indicating the arrival in a surveillance region of a noise-producing object which comprises: detecting the noise level in such surveillance region and producing a first electrical signal responsive thereto; detecting an increase in noise level in a portion of such surveillance region and producing a second electrical signal in response to such increase; comparing said first and second electrical signals and producing an indication only when said second signal exceeds said first signal; and continuously reestablishing said first signal in response to changes in such preexisting noise level.

7. The method of claim 6 wherein the preexisting noise level is detected at a number of locations throughout such surveillance region and noise common to a plurality of such locations is substantially cancelled.

8. The method of claim 7 wherein the noise detected is electromagnetic and such detection is accomplished by electrical coils.

9. The method of claim 8 wherein cancellation is achieved by connecting said coils in series with the polarities of approximately half of the coils being opposed to the polarities of the remaining coils.

10. The method of claim 6 wherein said first electrical signal is the output of a first electrical circuit having a relatively long time constant and said second electrical signal is the output of a second electrical circuit having a relatively short time constant.

* * * * *

PO-1050
(5/69)

UNITED STATES PATENT OFFICE
CERTIFICATE OF CORRECTION

Patent No. 3,634,843      Dated January 11, 1972

Inventor(s) Charles J. Corris

It is certified that error appears in the above-identified patent and that said Letters Patent are hereby corrected as shown below:

Column 1, line 72, "6 Hz" should be --6 KHz--.

See specification, page 3, line 22, as filed.

Column 2, line 35, "may" should be --any--.

See specification, page 4, line 30, as filed.

Column 3, line 20 "it" should be omitted before "is" and --be-- should be inserted after "to".

See specification, page 7, line 1, as filed.

Column 4, line 29, "continuously" should be --continually--.

See claim 6, line 10, as originally filed.

Signed and sealed this 25th day of July 1972.

SEAL)
Attest:

EDWARD M. FLETCHER, JR.      ROBERT GOTTSCHALK
Attesting Officer      Commissioner of Patents